Nov. 23, 1943.  R. R. ROHKAR  2,334,958
POWER TRANSMISSION MECHANISM
Filed June 10, 1942  2 Sheets-Sheet 2

Inventor:
Raymond R. Rohkar
By: Paul C. Pippel
Atty.

Patented Nov. 23, 1943

2,334,958

UNITED STATES PATENT OFFICE 2,334,958

POWER TRANSMISSION MECHANISM

Raymond R. Rohkar, Downers Grove, Ill., assignor to International Harvester Company, a corporation of New Jersey Application June 10, 1942, Serial No. 446,446

11 Claims. (Cl. 74—342)

This invention relates to a power transmission mechanism and more particularly to a change-speed transmission for a motor vehicle.

The present invention contemplates and has for its principal object the provision of a change-speed transmission incorporating mechanism for the establishment of a large number of speed ratios in both forward and reverse, together with a power output shaft or power take-off shaft which may be operated independently of the operation of the change-speed gearing or component parts thereof.

An important object of the invention is to provide an improved power transmission providing for the obtaining of a plurality of speed ratios in either forward or reverse, there being preferably obtainable as many reverse speeds as there are forward speeds.

Another important object is the provision of driving means for a power take-off shaft which may be operated independently of the direction of rotation of the main power output shaft of the transmission.

Another object is the provision of a transmission having a hollow countershaft which may be rotated in either direction to drive the transmission through a multiplicity of speed ratios in either forward or reverse and to combine therewith an independently driven power take-off shaft extending through the hollow countershaft.

Another object is to provide a compact power transmission mechanism with a minimum of shiftable parts, the gearing preferably being utilized to serve dual functions.

The foregoing and other objects and important features of the invention will become apparent to those skilled in the art as the disclosure is more fully made in the following detailed description and accompanying sheets of drawings, in which.

As stated above, the transmission mechanism herein disclosed is preferably adapted for use as the change-speed gear of a vehicle; although, it will be understood that the principles of the invention may be similarly utilized in other instances. The disclosure is accordingly intended to be representative and not limiting.

Figure 1:
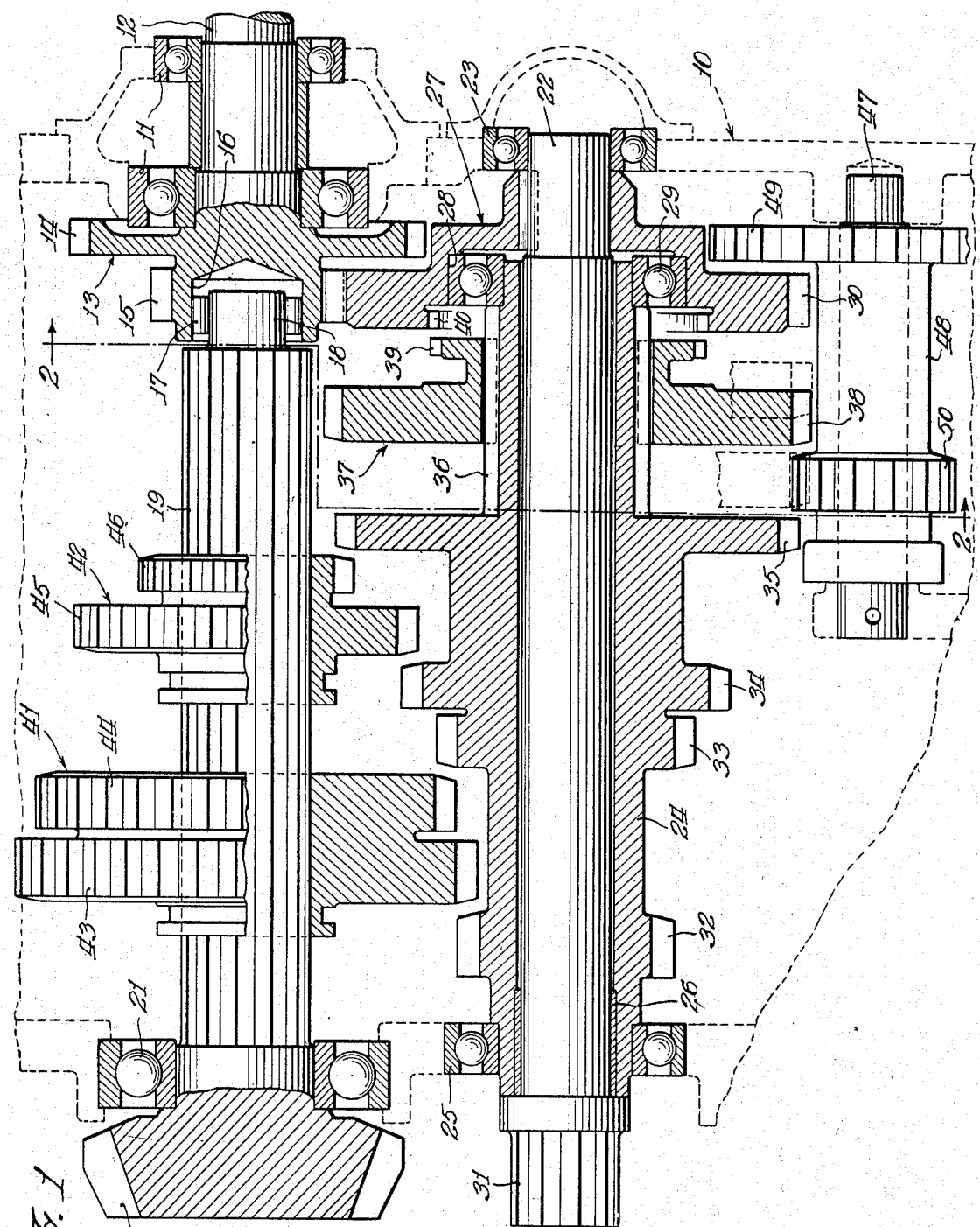
Figure 1 is a longitudinal sectional view through a transmission embodying the invention, the view being illustrated with the reverse idler gearing shown as displaced from its actual position.

As indicated in Figure 1, the reference character 10 designates generally a transmission housing. An upper portion of the transverse wall of the housing is provided with antifriction bearings 11 which journal a driving element or input shaft 12. This shaft may be connected in any suitable manner with an engine clutch, for example, not shown, of the type common in motor vehicles.

Rearwardly of the bearings 11 the shaft 12 is provided with a gear element, generally indicated at 13, comprising a large gear 14 and a comparatively smaller gear 15. These gears are illustrated as being integral parts of the driving shaft 12; although, it will be apparent that they may be formed separately and keyed to the shaft or otherwise mounted on the shaft for rotation therewith. The rearward end of the driving shaft 12 is enlarged to provide for the gear 15, and this enlargement is bored out to provide a cylindrical recess 16, which carries an antifriction bearing 17 journaling a reduced end portion 18 of a power output shaft 19. It will be noted that the shafts 12 and 19 are rotatable independently of each other and are disposed co-axially. The intermediate portion of the shaft 19 is splined and the rear end thereof is enlarged and formed as a driving bevel gear 20. It will be understood that the gear 20 may be formed separately from the shaft 19 and keyed thereon or otherwise secured thereto. A rear wall of the housing 10 journals the rear end of the shaft 19 on an antifriction bearing 21.

The housing 10 carries at a point below the shaft 19 a second power output shaft 22. The forward end of the shaft is journaled in a bearing 23 in a front wall of the housing 10. The rear end of the shaft is journaled in the rear wall of the housing through the medium of means interposed between that shaft and a hollow countershaft 24. The rear end of the countershaft is journaled in a bearing 25 in the rear wall of the housing. The shaft 22 extends through or is surrounded by the countershaft 24, the rear portions of the two shafts being inter-journaled on a bearing or bushing 26. The front end of the shaft 22 has keyed thereon a driving element 27 including a central portion provided with a cylindrical recess 28 in which is carried an antifriction bearing 29. This bearing journals the forward end of the countershaft 24. The outer enlarged portion of the driving element 27 is formed as a gear 30 which is preferably in constant mesh with the gear 15 on the driving shaft 12. From the description thus far it will be seen that the power output shaft 22 is continuously driven as long as the driving shaft 12 is driven. The rear end of the shaft 22 is provided with a splined portion 31 which serves as means for enabling the shaft to be connected to other drive elements for the purpose of driving auxiliaries or the like utilized with the vehicle.

The countershaft 24 is preferably formed as a one-piece element including a plurality of gears, such as a first-speed gear 32, a second-speed gear 33, a third-speed gear 34, and a fourth-speed gear 35. The end of the countershaft, in proximity to the antifriction bearing 29, is reduced in diameter and is splined as at 36. A driving element 37 is carried on the splined portion 36 of the countershaft and includes a first gear 38 and a comparatively smaller second gear 39. As previously stated, the driving element 27 on the shaft 22 is provided with a recessed central portion, and this portion is further formed with gear or clutch teeth providing a second gear part 40 on the driving element 27. As will be hereinafter described in detail, the driving element 37 on the countershaft 24 may be shifted axially into engagement with the gear part 40 on the driving element 27, by means of which the countershaft is rotated by power initially supplied by the driving shaft 12.

The output shaft 19 carries on its intermediate splined portion a pair of shiftable gear elements 41 and 42. The element 41 includes a first-speed gear 43 and a second-speed gear 44. These gears are shiftable into engagement with either of the first- or second-speed gears 32 and 33 on the countershaft 24. The element 42 includes a third-speed gear 45 and a fourth-speed gear 46 shiftable for engagement with the gears 34 and 35, respectively, on the countershaft 24.

Figure 2:
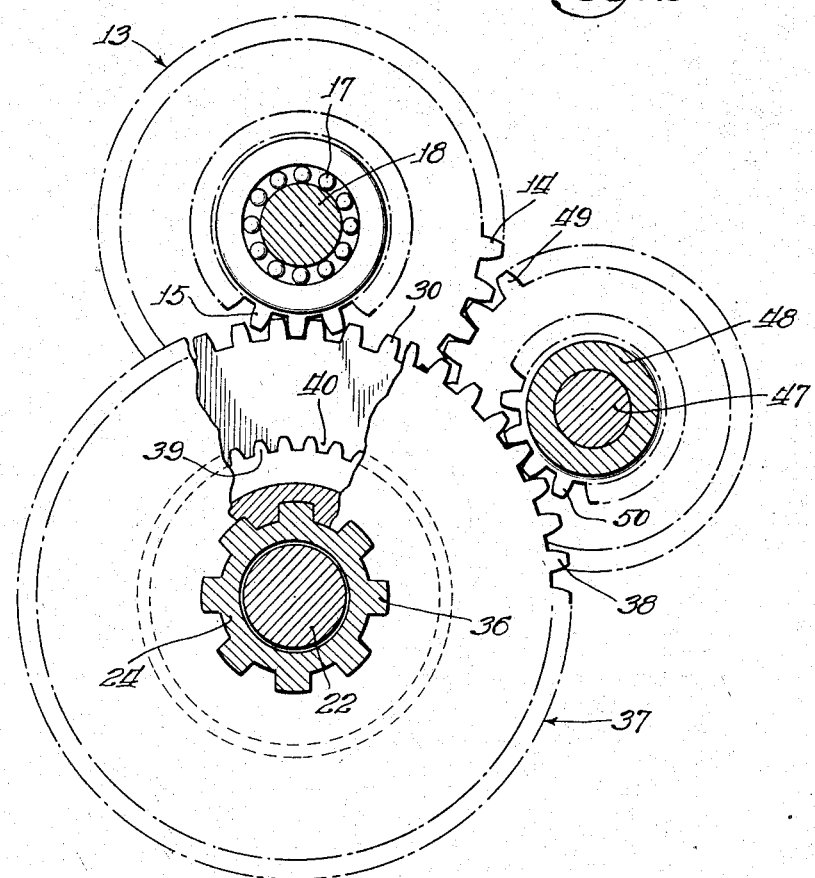
Figure 2 is a transverse sectional view taken along the line 2—2 of Figure 1, with portions of the gearing broken away to illustrate the invention more clearly.
Figure 3:
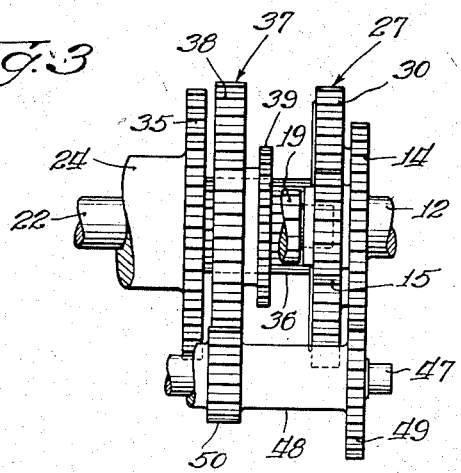
Figure 3 is a plan view on a reduced scale showing portions of the main driving gears.

As previously stated, an important feature of the present invention is the provision of gearing by which the transmission may have the same number of reverse speed ratios as forward speed ratios. In the preferred embodiment of the invention illustrated, this means comprises idler gearing interposed between the driving shaft 12 and the shiftable gear element 37 on the countershaft 24. The idler gearing includes a short shaft 47 appropriately journaled in the housing 10 and carrying rotatably thereon an idler gear element 48. This element has a first idler gear 49 and a second and comparatively smaller idler gear 50. As best shown in Figures 2 and 3, the idler gear shaft 47 is disposed at one side and parallel to the shafts 19 and 24. The larger idler gear 49 is in constant mesh with the larger gear 14 on the driving shaft 12. In the neutral (if desired) position of the shiftable gear element 37, the gear 38 does not mesh with the internal clutch or gear 40 of the driving element 27.

In the operation of the transmission, the countershaft 24 may be rotated in either forward or reversed directions. It will be understood, of course, that, although the preferred embodiment of the invention illustrates the dual rotation of the countershaft 24 as respects opposite directions, the principles of the invention may be similarly applied in the rotating of the countershaft 24 at different speeds. For example, the idler gear element 48 may be replaced with gearing serving to drive the countershaft 24 in a speed ratio that differs from the speed ratio in which the countershaft 24 is driven by the driving shaft 12 through the driving element 27 on the shaft 22.

When it is desired to operate the transmission with the countershaft rotating in the direction that will produce a plurality of speed ratios for the forward travel of the vehicle in which the transmission is mounted, the gear element 37 is shifted to the right (in Figure 1) so that the gear part 39 meshes with the gear part 40 in the driving element 27. With the parts in these positions, the countershaft 24 will be driven through the gears 15, 30, 40, and 39. The change-speed gears 43, 44, 45, and 46 may then be shifted in the usual manner with respect to the gears 32, 33, 34, and 35 on the countershaft 24 to produce the desired speed ratios. When it is desired to operate the vehicle in reverse, the gear element 37 is shifted to the left and out of engagement with the driving element 27, so that the gear 38 meshes with the gear 50 of the idler element 48. The countershaft will now be driven in a reversed direction from the gears 14, 49, 50, and 38. The speed changes possible by the shifting of the gear elements 41 and 42 may now be obtained in reverse. Thus it will be seen that the particular transmission makes possible the same number of speeds in either forward or reverse, and these speeds are in corresponding speed ratios.

During the shifting of the gear element 37 to obtain either forward or reverse rotation of the countershaft 24 there is no interference with either the operation or the direction of rotation of the power shaft 22. This is an important feature of the invention. In many instances it is desirable and sometimes necessary in the operation of a vehicle that the vehicle be operated forwardly and backwardly at substantially the same rate of speed, meanwhile the operation of auxiliaries being unaffected. This desirable result is possible in a transmission constructed according to the principles of the present invention. The shaft 22, which serves as a second power output shaft or as a power take-off shaft, is driven by the driving shaft 12 independently of the driving of the countershaft 24; and, although the gear element 37 is shiftable into engagement with the driving element 27 on the shaft 22, operation of the shaft 22 is not interfered with. Accordingly, it will be seen that the shaft 22 is driven continuously as long as the driving shaft 12 is driven and this irrespective of whether the countershaft 24 is driven in forward or reverse (or at all).

From the foregoing description it will be seen that an improved power transmission mechanism has been provided capable of attaining the objects heretofore enumerated. It will be seen that the arrangement of the shiftable gearing is such that a compact unit is provided in a housing of minimum size. The arrangement of the gearing 14, 15, 30, and 38 with respect to the idler gears 49 and 50 is particularly advantageous, especially since the gear element 37 is slidable on the countershaft 24 and serves the dual function of driving the countershaft in either direction. Other features of the invention may be found in the mounting of the shafts 22 and 24 with the means providing for the interjournaling of these shafts such as the bearings 26 and 29. Other important features of the invention will readily suggest themselves to those skilled in the art.

It will be understood, of course, that only a preferred embodiment of the invention has been illustrated and described and that numerous modifications and alterations may be made therein without departing from the spirit and scope of the invention as defined in the appended claims.

What is claimed is:

1. Power transmission mechanism comprising a driving shaft, a coaxial power output shaft, a hollow countershaft paralleling the output shaft, shiftable means for rotating the countershaft from the driving shaft optionally in either forward or reverse, shiftable drive means between the countershaft and output shaft, a second output shaft extending through the hollow countershaft, and means for driving the second output shaft from the driving shaft irrespective of rotation of or the direction of rotation of the countershaft.

2. Power transmission mechanism comprising a driving element, a coaxial power output shaft, a hollow countershaft, means for rotating the countershaft from the driving element optionally in either forward or reverse, shiftable drive means between the countershaft and output shaft, a second output shaft extending through the hollow countershaft, and means for driving the second output shaft from the driving element irrespective of rotation of or the direction of rotation of the countershaft.

3. Power transmission mechanism comprising a driving element having first and second gears; a coaxial output shaft; a parallel, hollow countershaft; drive means between the output shaft and countershaft; disconnectable drive means, including the first gear on the driving element, for driving the countershaft optionally in either forward or reverse; a second output shaft extending through the hollow countershaft; and means, including the second gear on the driving element, for driving the second output shaft independently of driving of the countershaft.

4. Power transmission mechanism comprising a driving element having first and second gears; a coaxial output shaft; a parallel, hollow countershaft; drive means between the output shaft and countershaft; a second output shaft extending through the hollow countershaft and including a drive member; means including said drive member and one of the gears on the aforesaid driving element for driving said second output shaft; and means shiftable in one position to be driven by said drive member to drive the countershaft in one direction and in another position to be driven by the other of the gears on the aforesaid driving element to drive the countershaft in the other direction.

5. A change-speed transmission comprising a driving shaft, a second, coaxial shaft, a third, hollow shaft spaced from the second shaft, shiftable change-speed gearing between the second and third shafts, disconnectible and reversible driving means between the driving shaft and the third shaft for rotating said third shaft in either forward or reverse, a fourth shaft extending through the hollow shaft, and means for driving said fourth shaft continuously from the driving shaft independently of the driving of the third shaft and irrespective of the direction of rotation thereof.

6. A change-speed transmission comprising a driving shaft having gear means thereon; a coaxial shaft journaled at one end in said driving shaft; a driven shaft spaced from said driving shaft and including a gear in driving engagement with the aforesaid gear means; a second, hollow driven shaft surrounding the first driven shaft; shiftable gear means between the aforesaid coaxial shaft and the hollow shaft; idler gearing driven by the aforesaid gear means; and an element on the second driven shaft shiftable for optional driving engagement with the gear on the first driven shaft or the idler gearing.

7. A change-speed transmission comprising a driving shaft having first and second gear means thereon; a coaxial shaft journaled at one end in said driving shaft; a driven shaft spaced from said driving shaft and including a gear in driving engagement with the first of the aforesaid gear means; a second, hollow driven shaft surrounding the first driven shaft and having one end piloted in the gear on said first driven shaft; shiftable gear means between the aforesaid coaxial shaft and the hollow shaft; idler gearing driven by the second of the aforesaid gear means; and an element on the second driven shaft shiftable for optional driving engagement with the gear on the first driven shaft or the idler gearing.

8. A change-speed transmission comprising a driving shaft having first and second gears; a coaxial output shaft having one end journaled on said driving shaft; a hollow countershaft paralleling the output shaft; change-speed gearing between the output shaft and countershaft; a second output shaft extending through the hollow countershaft; a drive element keyed on the second output shaft and including means journaling one end of the countershaft and first and second drive portions, the first meshing with the first gear on the driving shaft; idler gearing driven by the second gear on the driving shaft; and a shiftable gear element slidable on the countershaft into optional engagement with the idler gearing or with the second drive portion on the second output shaft.

9. Power transmission mechanism comprising a driving element having first and second gears; a parallel, hollow, driven shaft; a second driven shaft extending through the hollow shaft; means inter-journaling said driven shafts; a drive member keyed on one driven shaft and including first and second drive portions, the first of which meshes with the first gear on the driving element; idler gearing meshing with the second gear on the driving element; and a shiftable gear element on the other driven shaft optionally slidable thereon into engagement with the idler gearing or the second drive portion on the aforesaid drive member.

10. Power transmission mechanism comprising a driving shaft having first and second gears; a parallel, hollow, driven shaft; a second driven shaft extending through the hollow shaft; means inter-journaling said driven shafts; a drive member keyed on the second driven shaft and including an internal drive portion and an external drive portion, the external drive portion meshing with the first gear on the driving shaft; idler gearing meshing with the second gear on the driving shaft; and a shiftable double gear element on the other driven shaft optionally slidable thereon into engagement with the idler gearing or the internal drive portion on the aforesaid drive member.

11. A change-speed transmission comprising a driving shaft including a plurality of gear elements rotatable therewith; a second gear element, including a first drive part meshing with one of the driving-shaft gear elements, and a second drive part; a driven shaft journaled at one end on the second gear element; idler gearing including a gear meshing with another of the driving-shaft gear elements; and a gear element on and rotatable with the driven shaft and shiftable thereon for optional engagement with either the idler gearing or the second drive part of the second gear element.

RAYMOND R. ROHKAR.